A. G. STOHN & F. LACROIX.
LIQUID MEASURING DEVICE.
APPLICATION FILED JUNE 24, 1915.

1,223,120.

Patented Apr. 17, 1917.

UNITED STATES PATENT OFFICE.

ARTHUR G. STOHN, OF JERSEY CITY, AND FRED LACROIX, OF HASBROUCK HEIGHTS, NEW JERSEY.

LIQUID-MEASURING DEVICE.

1,223,120.  Specification of Letters Patent.  Patented Apr. 17, 1917.

Application filed June 24, 1915. Serial No. 36,094.

*To all whom it may concern:*

Be it known that we, ARTHUR G. STOHN, a citizen of the United States, and a resident of Jersey City, in the county of Hudson and State of New Jersey, and FRED LACROIX, a citizen of the United States, and a resident of Hasbrouck Heights, in the county of Bergen and State of New Jersey, have invented certain new and useful Improvements in Liquid-Measuring Devices, of which the following is a description.

The invention relates to improvements in liquid measuring devices such as are employed in measuring doses of medicine. It has for its object the provision of a combined liquid container and measuring device that will avoid the use of the bottle, drinking glass and measuring spoon ordinarily employed in taking liquid medicines. It also has for its object the provision of a device that is particularly adapted to the uses of travelers, whereby liquid medicine can be carried in their baggage without danger of it leaking and soiling the other contents.

The invention consists in the novel construction, combination and arrangement of parts hereinafter described, pointed out in the appended claim, and illustrated by the accompanying drawings.

In the drawings, in which similar reference characters designate corresponding parts, Figure 1 is a perspective view of a liquid measuring device embodying the invention.

Figure 1:
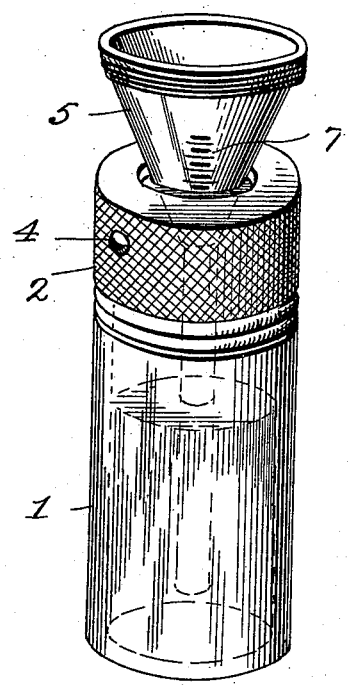

The receptacle 1, of glass or other suitable material, is of a cylindrical formation, and its exterior wall at the upper end is threaded to receive the metal screw-cap 2. There is considerable length to the engaging threaded parts of the receptacle and cap so that there can be considerable vertical movement of the cap with the threads in engagement.

Seated in the inner end of the cap against the crown of the same is the piston 3 of rubber or other elastic material, the piston being held firmly in place by the screws 4 passing through the wall of the cap into the piston. The piston forms an adjustable stopper for the receptacle, and its upper end is of a cylindrical shape for a considerable length of the piston. The cylindrical part of the piston tightly fits the mouth of the receptacle so that air cannot escape from the receptacle past the piston while the latter is being moved up and down in the mouth of the receptacle. Owing to the length of the cylindrical part of the piston and the length of the threaded engagement between the cap and receptacle the piston can have considerable vertical adjustment in the receptacle while the air is held within the receptacle. The lower end of the piston is tapered so that it will readily enter the receptacle.

Passing through the piston 3 is the funnel 5 with its lower end in close proximity to the bottom of the receptacle. The funnel tightly fits the piston so that air cannot escape between the two from the receptacle. The crown of the cap has a circular opening to admit the funnel, and there is an annular space between the edge of the crown and the funnel so that the metal of the cap will not interfere with the seating of the funnel in the piston. The funnel is provided with a threaded cover 6 to prevent leakage from the funnel. On the side of the funnel are the graduating marks 7 to measure the contents of the funnel.

Figure 2:
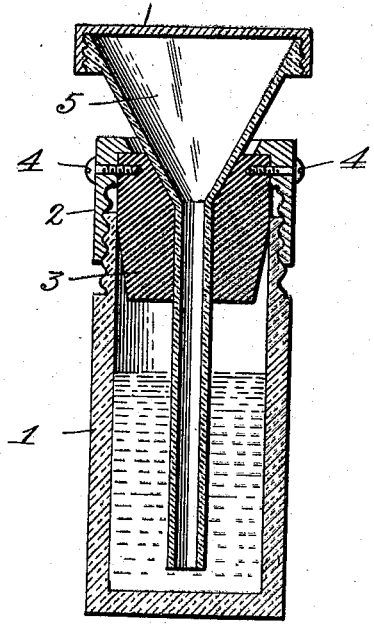
Fig. 2 is a vertical sectional view of the same.
Figure 3:
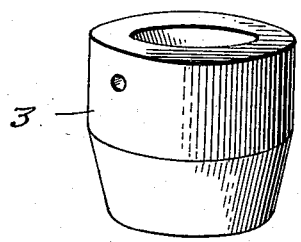
Fig. 3 is a detail perspective view, showing the piston.

The operation of the device is as follows: To fill the receptacle the threaded cover is removed and the cap is partly unscrewed until the cylindrical part of the piston slightly clears the mouth of the receptacle so that the air can escape from the interior of the receptacle. The medicine is then poured into the funnel and enters the receptacle, the air above the liquid escaping between the mouth of the receptacle and the piston. The screw-threaded engagement between the cap and receptacle is not airtight so that the air from beneath the cap can escape through such engagement. After the medicine has been introduced the screw-cap is turned down onto the receptacle until the lower end of the cylindrical part of the piston projects slightly into the mouth of the receptacle, as shown in Fig. 2. This will close the receptacle except through the funnel, which is closed by turning the threaded cover into place.

When it is desired to take a dose of the medicine the threaded cover is removed and the screw-cap is turned down to force the piston into the receptacle. As the fluid in the receptacle cannot escape between the piston and the mouth of the receptacle, the downward movement of the piston will force the medicine upwardly through the stem of the funnel into the bowl of the latter. By means of the graduating marks on the side of the bowl of the funnel it can be ascertained when the required quantity has been forced into the bowl. If there should not be sufficient downward play of the piston left for the next dose, the screw-cap is turned upward so that the piston opens the mouth of the receptacle to admit air to replace the liquid that has been displaced. After the admission of the air the piston is forced down until it closes the mouth of the receptacle and is in position to force the next dose into the funnel. As the screw-thread connection between the cap and receptacle is not air-tight, air can pass by the threads into the receptacle. After the dose has been drunk from the bowl of the funnel, the bowl can be cleaned by being placed under a faucet. The threaded cover screwed over the mouth of the funnel will prevent contamination, and will also prevent leakage should the receptacle be placed on its side.

It is to be observed that the lower end of the tube of the funnel opens into the receptacle in close proximity to the bottom thereof so that the entire contents, or nearly so, of the receptacle can be expelled through the funnel. The funnel and its tube are detachably mounted in the piston so that the funnel can be readily replaced should it become broken.

Having thus described our invention, what we claim and desire to secure by Letters Patent is:

In a liquid measuring device, a receptacle having a cylindrical mouth with its exterior wall screw-threaded, a screw-threaded cap engaging the screw-threaded mouth of the receptacle, an elastic piston secured in the inner end of the cap and fitting into the mouth of the receptacle so that the downward movement of the cap will force the piston into the receptacle to displace the contents thereof, and a funnel removably mounted in the piston with its stem extending into the receptacle in close proximity to the bottom thereof so that the contents of the receptacle displaced by the inward movement of the piston will flow through the stem into the bowl of the funnel.

In testimony whereof we hereunto affix our signatures.

ARTHUR G. STOHN. [L. S.]
FRED LACROIX. [L. S.]

Witness:
JOHN W. ZELTMANN.

Copies of this patent may be obtained for five cents each, by addressing the "Commissioner of Patents, Washington, D. C."